(12) United States Patent
Foursa et al.

(10) Patent No.: US 7,085,039 B2
(45) Date of Patent: Aug. 1, 2006

(54) HYBRID RAMAN/ERBIUM-DOPED FIBER AMPLIFIER AND TRANSMISSION SYSTEM WITH DISPERSION MAP

(75) Inventors: Dmitri Foursa, Freehold, NJ (US); Morten Nissov, Ocean, NJ (US); Alexei N. Pilipetskii, Colts Neck, NJ (US); Michael A. Mills, Freehold, NJ (US); Chinlon Lin, Holmdel, NJ (US); Bo Pedersen, Annapolis, MD (US)

(73) Assignee: Tyco Telecommunications (US) Inc., Morristown, NJ (US)

( * ) Notice: Subject to any disclaimer, the term of this patent is extended or adjusted under 35 U.S.C. 154(b) by 219 days.

(21) Appl. No.: 10/389,373

(22) Filed: Mar. 14, 2003

(65) Prior Publication Data

US 2003/0179440 A1    Sep. 25, 2003

Related U.S. Application Data

(60) Provisional application No. 60/365,048, filed on Mar. 15, 2002.

(51) Int. Cl.
*H04B 10/12* (2006.01)
(52) U.S. Cl. .................. 359/334; 359/337.4; 359/337.5
(58) Field of Classification Search ................ 359/334, 359/337.4, 337.5
See application file for complete search history.

(56) References Cited

U.S. PATENT DOCUMENTS

| | | | |
|---|---|---|---|
| 5,559,920 A * | 9/1996 | Chraplyvy et al. | ......... 385/123 |
| 6,038,356 A | 3/2000 | Kerfoot, III et al. | |
| 6,052,219 A | 4/2000 | Kidorf et al. | |
| 6,137,604 A | 10/2000 | Bergano | |
| 6,172,803 B1 * | 1/2001 | Masuda et al. | ........ 359/337.12 |
| 6,178,038 B1 * | 1/2001 | Taylor et al. | ............ 359/337.5 |
| 6,188,823 B1 | 2/2001 | Ma | |

(Continued)

FOREIGN PATENT DOCUMENTS

EP    1115184    7/2001

(Continued)

OTHER PUBLICATIONS

H. Masuda, et al., "Ultra-wideband optical amplificaiton with 3dB bandwidth of 65 nm using a gain-equalised two-stage erbium-doped fibre . . . ," Electronics Letters, vol. 33 (No. 9), (Apr. 24, 1997).

(Continued)

*Primary Examiner*—Jack Keith
*Assistant Examiner*—Eric Bolda
(74) *Attorney, Agent, or Firm*—Grossman Tucker Perreault & Pfleger, PLLC

(57) ABSTRACT

A hybrid Raman-EDFA provides gain equalization over the C-band and L-band. The hybrid Raman-EDFA includes a Raman section producing a Raman gain and an EDFA section producing an EDFA gain complementing the Raman gain. The EDFA section preferably includes a highly inverted, single-stage EDFA to produce the complementing EDFA gain shape. One embodiment of the EDFA section includes a high return loss termination located after the erbium fiber to receive unabsorbed pump power. Multiple hybrid Raman-EDFAs can be connected in an amplifier chain in a transmission system. The transmission system preferably provides a dispersion map including regular composite fiber spans followed by at least one compensating span of negative dispersion fibers. The Raman sections of the hybrid Raman-EDFAs are preferably coupled to negative dispersion fiber in the transmission system.

25 Claims, 5 Drawing Sheets

U.S. PATENT DOCUMENTS

| | | | |
|---|---|---|---|
| 6,263,003 B1 | 7/2001 | Huang et al. | 372/6 |
| 6,311,002 B1 | 10/2001 | Evangelides et al. | |
| 6,317,238 B1 | 11/2001 | Bergano et al. | |
| 6,320,884 B1 | 11/2001 | Kerfoot, III et al. | |
| 6,396,624 B1 | 5/2002 | Nissov et al. | |
| 6,404,964 B1 * | 6/2002 | Bhagavatula et al. | 385/123 |
| 6,414,786 B1 | 7/2002 | Foursa | |
| 6,424,455 B1 | 7/2002 | Dmitri | |
| 6,522,796 B1 * | 2/2003 | Ziari et al. | 385/11 |
| 6,633,712 B1 * | 10/2003 | Dennis et al. | 385/123 |
| 6,693,740 B1 * | 2/2004 | Gray et al. | 359/337.4 |
| 6,771,414 B1 * | 8/2004 | Masuda et al. | 359/341.1 |
| 6,813,425 B1 * | 11/2004 | Kim et al. | 385/123 |
| 2002/0114061 A1 * | 8/2002 | Naito et al. | 359/334 |
| 2002/0131160 A1 * | 9/2002 | McNicol | 359/337.5 |
| 2003/0039436 A1 * | 2/2003 | Bennion et al. | 385/24 |

FOREIGN PATENT DOCUMENTS

| | | |
|---|---|---|
| EP | 1116697 | 7/2001 |
| GB | 2331621 | 5/1999 |
| WO | WO02/19576 | 3/2002 |
| WO | WO02056069 A2 | 7/2002 |

OTHER PUBLICATIONS

S.N. Knudsen, et al., "New Dispersion-Slope Managed Fiber Pairs for Ultra Long Haul Transmission Systems," National Fiber Optic Engineers Conference, p. 1599-1607, (Mar. 14, 2001).

Masuda et al; "75-nm 3-dB Gain-band Optical Amplification with Erbium-doped Fluoride Fibre Amplifiers and Distributed Raman Amplifiers in 9×2.5-Gb/s WDM Transmission Experiment"; Sep. 22-25, 1997; Conference Publication No. 448; pp. 73-76.

Foursa et al; "2.56 Tb/s (256×10 Gb/s) Transmission Over 11,000 km using Hybrid Raman/EDFAs with 80 nm of Continuous Bandwidth"; 2002; pp. FC3-1-3; OFC 2002 Postdeadline Papers.

European Search Report mailed on Feb. 22, 2005 related to European Appln. No. 03251559.5.

* cited by examiner

HYBRID RAMAN/ERBIUM-DOPED FIBER AMPLIFIER AND TRANSMISSION SYSTEM WITH DISPERSION MAP

CROSS-REFERENCE TO RELATED APPLICATIONS

This application claims the benefit of U.S. provisional application Ser. No. 60/365,048 filed Mar. 15, 2002, which is fully incorporated herein by reference.

TECHNICAL FIELD

The present invention relates to optical amplifiers and more particularly, to a hybrid Raman/erbium-doped fiber amplifier (EDFA) and a transmission system having a dispersion map and a chain of hybrid Raman/EDFAs.

BACKGROUND INFORMATION

Optical fiber technology is currently utilized in communications systems to transfer information, e.g., voice signals and data signals, over long distances as optical signals. Over such long distances, however, the strength and quality of a transmitted optical signal diminishes. Accordingly, techniques have been developed to regenerate or amplify optical signals as they propagate along an optical fiber. When multiple different wavelengths are transmitted down the same optical fiber using wavelength division multiplexing (WDM), each of the wavelengths must be amplified. Amplification techniques for use in WDM systems have been implemented using Raman amplifiers and erbium doped fiber amplifiers (EDFAs).

Increasing the amount of information to be carried by telecommunications systems increases the demand for optical amplifiers having higher bandwidth to achieve the required amplification in a WDM system and particularly, an ultra-long haul dense wavelength division multiplexing (DWDM) system. Achieving gain equalization (i.e., flatness in amplification across the bandwidth) over a wider bandwidth has also been an objective of optical amplifiers. EDFAs have achieved gain equalization of the conventional-band or C-band over transoceanic distance. To greatly increase the capacity of ultra-long haul DWDM systems, however, gain equalization must be achieved beyond the EDFA's C-band. EDFAs have been able to achieve increased bandwidth by using the long wavelength band or L-band. However, C+L band EDFAs have had drawbacks such as complicated parallel optical designs and inferior noise performance compared to C-band EDFAs.

Hybrid Raman-EDFAs are known for their increased bandwidth and/or higher signal to noise ratio (SNR) compared to conventional C-band EDFAs. In a hybrid Raman-EDFA, Raman amplification can be used to assist the EDFA in the same bandwidth or to increase the bandwidth beyond the effective bandwidth of the EDFA. One way to increase the bandwidth is to use the EDFA as the C-band amplifier and use the distributed Raman effect to achieve the L-band amplification. The Raman gain and the EDFA gain dominate in the L-band and C-band, respectively, but also contribute to a certain extent in the adjacent band amplification. One example of a hybrid Raman-EDFA has provided continuous bandwidths over both the C-band and the L-band using erbium-doped fluoride fiber EDFAs and is described in greater detail by Hiroji Masuda, Shingo Kawai, Ken-Ichi Suzuki and Kazuo Aida in the article "75-nm 3-dB Gain-band Optical Amplification with Erbium-doped Fluoride Fibre Amplifiers and Distributed Raman Amplifiers in 9×2.5-Gb/s WDM Transmission Experiment," Poc. of European Conf. On Optical Communications, ECOC '97, 15, 73–76 (1997).

These conventional hybrid Raman-EDFAs are designed for terrestrial systems. Because longer spans are typically used in such systems, the required gain is relatively large and the input power is relatively low. Thus, the terrestrial amplifier is optimally designed with multiple stages. Because the required gain is lower in a long-haul submarine system having shorter transmission spans, the multiple stage amplifier designs would actually degrade performance. Accordingly, there is a need for a hybrid Raman-EDFA capable of providing a substantially flat gain over a wider bandwidth in a submarine telecommunications system or other ultra-long haul telecommunications system.

SUMMARY

In accordance with one aspect of the present invention, a system is provided for amplifying an optical signal. The system comprises a transmission path for transmitting the optical signal and at least one Raman pump coupled to the transmission path for single wavelength unpolarized backward Raman pumping to produce Raman gain in the optical signal. A single-stage erbium doped fiber amplifier (EDFA) is coupled to the transmission path after the Raman pumping to produce an EDFA gain in the optical signal complimenting the Raman gain. The EDFA includes a length of erbium doped fiber and an EDFA pump coupled to the erbium doped fiber. The EDFA is highly inverted such that gain shapes of the Raman gain and the EDFA gain are complimentary and provide a substantially flat composite gain shape.

One embodiment of the system further comprises a high return loss termination coupled after the erbium fiber such that unabsorbed radiation from the EDFA pump is directed to the termination. In another embodiment of the system, the transmission path includes a fiber span combining positive dispersion fibers having a large effective area followed by negative dispersion fibers having a small effective area. The Raman pump is coupled to the negative dispersion fibers.

According to another aspect of the present invention, a transmission system comprises a transmitter, a receiver, and a transmission path providing a dispersion map between the transmitter and the receiver. The transmission path comprises a first group of composite fiber spans, at least one compensating span following the first group of composite fiber spans, and a second group of composite fiber spans following the compensating span. The composite fiber spans include a combination of positive dispersion fibers and negative dispersion fibers and have a residual positive dispersion. The compensating span includes negative dispersion fibers. A plurality of hybrid Raman-EDFAs are connected respectively between the fiber spans. Each of said Raman-EDFAs include a Raman section and a single-stage EDFA section, and each Raman section is coupled to negative dispersion fibers of a respective one of the fiber spans.

According to another aspect, an EDFA comprises a length of erbium doped fiber, an EDFA pump for forward pumping the erbium doped fiber, a wavelength division multiplexer (WDM) at the output of the erbium doped fiber for redirecting unabsorbed pump radiation, and a high return loss termination coupled to the WDM such that the unabsorbed pump radiation is directed to the termination.

According to yet another aspect, a system for amplifying an optical signal comprises a transmission span including a combination of large effective area and small effective area dispersion matched fibers. At least one Raman pump is coupled to the fiber with the small effective area for generating a pump wavelength and backward pumping the pump wavelength into the fiber span to produce a Raman gain in the optical signal. An erbium doped fiber amplifier (EDFA) is coupled after the Raman pump and includes a length of erbium doped fiber and an EDFA pump coupled to the erbium doped fiber to produce an EDFA gain complementing the Raman gain.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
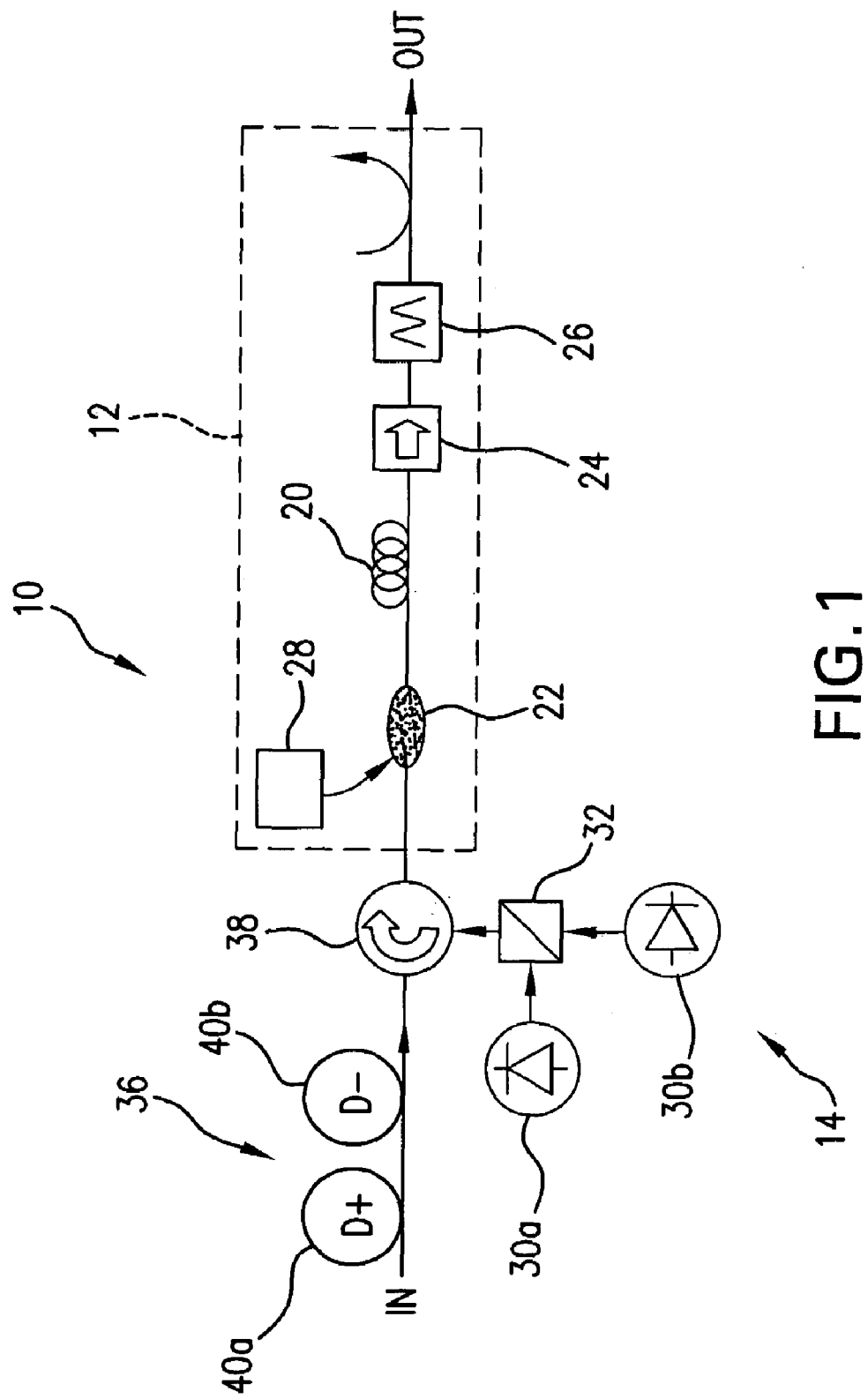
FIG. 1 is a schematic block diagram of a hybrid Raman-EDFA, according to one embodiment of the present invention.

Referring to FIG. 1, a hybrid Raman-EDFA 10 combines Raman gain with EDFA gain to achieve a continuous bandwidth over the C-band and the L-band (e.g., about 80 nm) on a common optical path. Gain equalization techniques are used to maintain a substantially flat gain performance over transoceanic transmission distances (e.g., 11,000 km). Although the exemplary embodiment of the present invention is designed for use in a transmission system to provide amplification in a long-haul submarine system, the hybrid Raman-EDFA 10 can also be used in other systems.

Figure 2:
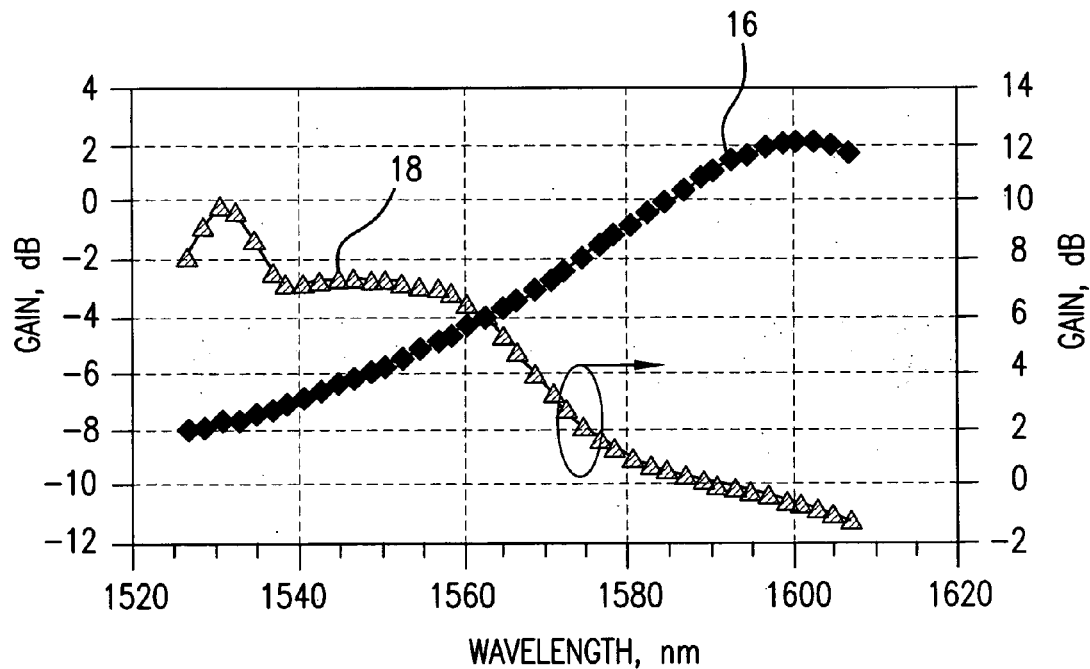
FIG. 2 is a graph illustrating the gain shapes attributed to the Raman and EDFA sections shown in FIG. 1.
Figure 3:
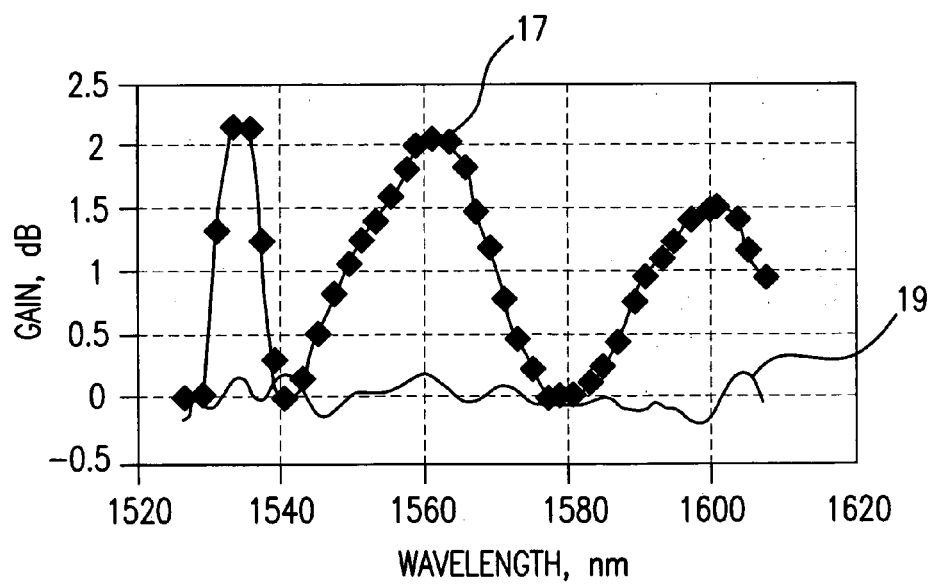
FIG. 3 is a graph illustrating the unequalized and equalized gain shapes of the hybrid Raman-EDFA shown in FIG. 1.

In general, each hybrid Raman-EDFA 10 includes an EDFA section 12 and a Raman section 14 providing complementing gain shapes. Exemplary gain shapes 16, 18 attributed to the respective Raman section 14 and the EDFA section 12 are shown in FIG. 2. The gain shapes 16, 18 show net Raman and EDFA gains with span and component losses taken into account. As indicated by the gain shapes 16, 18, the Raman and EDFA gains dominate in the L-band and C-band, respectively, but also contribute to amplification in the adjacent band. Thus, the gain shape 18 of the EDFA section 12 complements the gain shape 16 of the Raman section 14, resulting in the flattening of the overall combined Raman-EDFA gain shape. When the gain spectra of the Raman and EDFA sections 12, 14 complement each other, there is a synergistic effect and the hybrid Raman-EDFA 10 provides wide continuous bandwidth with minimum gain ripple. FIG. 3 shows both unequalized and equalized gain shapes 17, 19 for a single hybrid Raman-EDFA 10. In the exemplary embodiment, the total amplifier output power is about 18.6 dBm.

The EDFA section 12 is preferably a standard single-stage 980 nm forward pumped configuration. The EDFA section 12 is highly inverted to provide maximum gain in the C-band and lower gain in the L-band such that the EDFA long wavelength edge substantially matches the Raman wavelength edge, as indicated by the gain shapes 16, 18. In the exemplary embodiment, the average inversion of the EDFA 12 is ~0.74 (where 1 is fully inverted and 0 is un-inverted), as compared to an average inversion lower than 0.7 in conventional C-band amplifiers with bandwidths up to 43 nm.

The EDFA section 12 includes a short length of erbium fiber 20 (e.g., about 7 m of erbium fiber with peak absorption of about 4.5 dB/m) forward pumped by a 980 nm wavelength pump 28 coupled to the signal transmission path with a coupler 22, such as a WDM coupler. An isolator 24 is coupled at an output of the erbium fiber 20 to provide unidirectional propagation. A gain flattening filter 26 on the output of the EDFA 12 is designed to equalize the combined Raman-EDFA gain shape. Other types of rare-earth doped fibers are also contemplated for use in the present invention.

The Raman section 14 preferably provides single wavelength unpolarized backward Raman pumping in front of each single-stage EDFA 12. The Raman pump wavelength is preferably 1497 nm to produce the gain shape 16 that best complements the gain shape 18 of the highly inverted EDFA 12. One preferred embodiment of the Raman section 14 includes lasers 30(a), 30(b), such as semiconductor laser diodes, to provide the Raman pumping. The lasers 30(a), 30(b) are preferably polarization multiplexed, for example, by combining the outputs in a polarization beam coupler 32. In the preferred embodiment, the lasers 30(a), 30(b) are also grating stabilized. The pump radiation from the Raman section 14 is coupled into a transmission path, such as a fiber span 36, using a circulator 38 to achieve simultaneous low loss and isolation for both pump and signals.

In one embodiment, the transmission path or fiber span 36 coupled to the hybrid Raman-EDFA 10 includes a combination of large effective area ($A_{eff}$) and small effective area ($A_{eff}$) dispersion matched fibers in a 2:1 ratio. The large $A_{eff}$ fibers 40a have a positive dispersion and the small $A_{eff}$ fibers 40b have a negative dispersion. The large $A_{eff}$ of the positive dispersion fibers 40a is preferably greater than about 75 μm². The small $A_{eff}$ of the negative dispersion fibers 40b can be in the range of about 30–40 μm². In one example, the large $A_{eff}$ is about 110 μm² with a dispersion of about +20 ps/nm/km and the small $A_{eff}$ is about 30 μm² with a dispersion of about −40 ps/nm/km. The exemplary fiber span 36 preferably has a very low dispersion slope (e.g., about 2 fs/nm²/km at 1550 nm for the system). Coupling the Raman pump or lasers 30a, 30b into the small $A_{eff}$ fibers 40b optimizes Raman efficiency, although a larger effective area is preferred overall to optimize performance.

Figure 4:
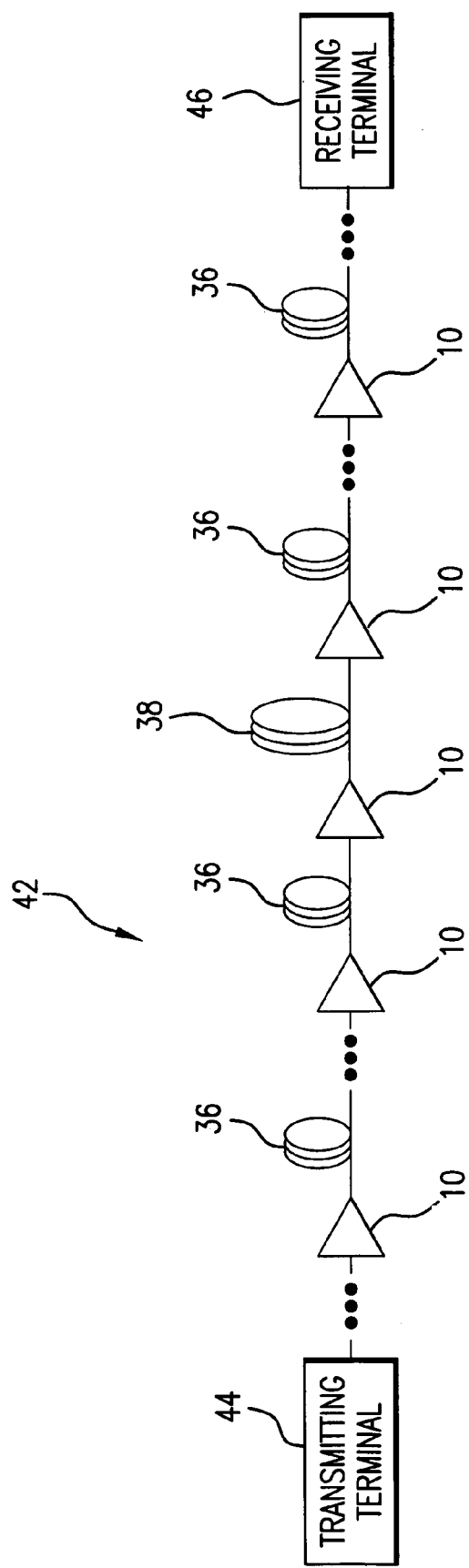
FIG. 4 is a schematic diagram of a transmission system having a dispersion map and including multiple hybrid Raman-EDFAs connected together in an amplifier chain, according to one embodiment of the present invention.

FIG. 4 shows a transmission system 42 including hybrid Raman-EDFAs 10 connected together in an amplifier chain between a transmitter 44 and a receiver 46. The transmission system 42 includes a plurality of regular composite fiber spans 36 and at least one compensating span 38 coupled respectively between the hybrid Raman-EDFAs 10. The regular span 36 preferably includes a combination of positive and negative dispersion fibers with a residual positive dispersion. The compensating span 38 preferably includes all negative dispersion fibers. The hybrid Raman-EDFAs 10 are coupled into the negative dispersion fibers of the regular spans 36 and the compensating span 38. Because the negative dispersion fibers have a smaller effective area ($A_{eff}$), the Raman efficiency is optimized.

Figure 5:
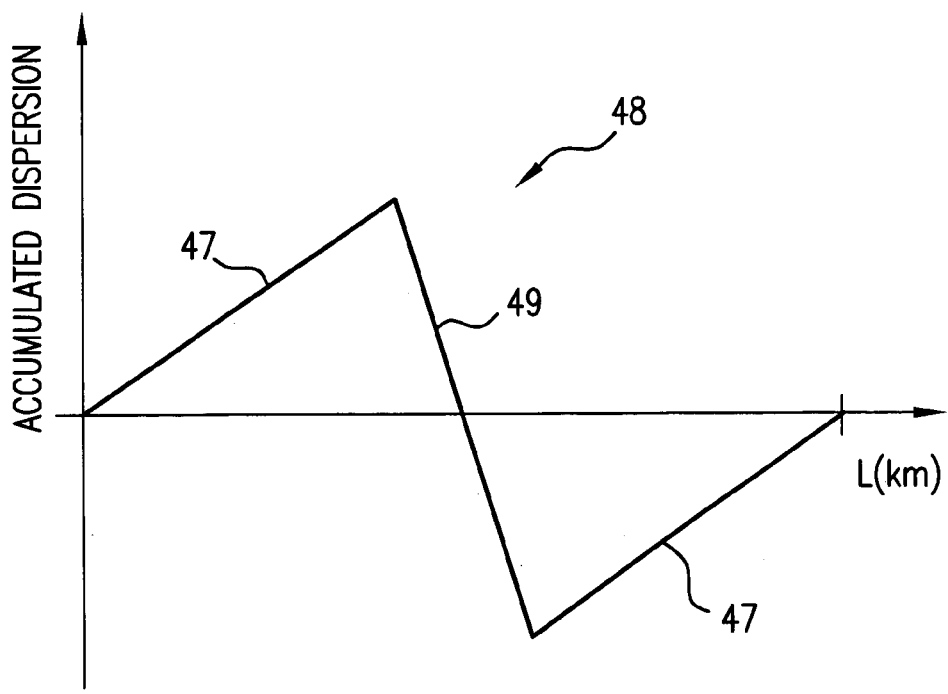
FIG. 5 is a graph illustrating a dispersion map showing the accumulation of span average dispersion in the transmission system shown in FIG. 4.

FIG. 5 illustrates a dispersion map 48 showing the accumulation of span average dispersion in the transmission system 42. First and second groups of the regular spans 36 correspond to the average positive dispersion 47. The compensating span 38 corresponds to the negative dispersion 49, which alters the accumulated positive dispersion generally in the middle of the dispersion map 48. To implement this dispersion map 48, one embodiment of the transmission system 42 includes five regular spans 36 followed by a compensating span 38 followed by five more regular spans 36.

In general, using a dispersion map helps to reduce nonlinear effects and channel crosstalk as well as sensitivity to deviations of dispersion parameters. The use of the regular spans 36 including negative and positive dispersion fibers also significantly increases the bandwidth of the system by the reduction of the dispersion slope. By launching pump power into the negative dispersion sections of the dispersion slope matched fiber span, lower levels of Raman pump power are required. Although the exemplary embodiment discloses a chain of hybrid Raman-EDFAs 10, the dispersion map 48 can also be used with other Raman amplifiers or EDFAs.

Figure 6:
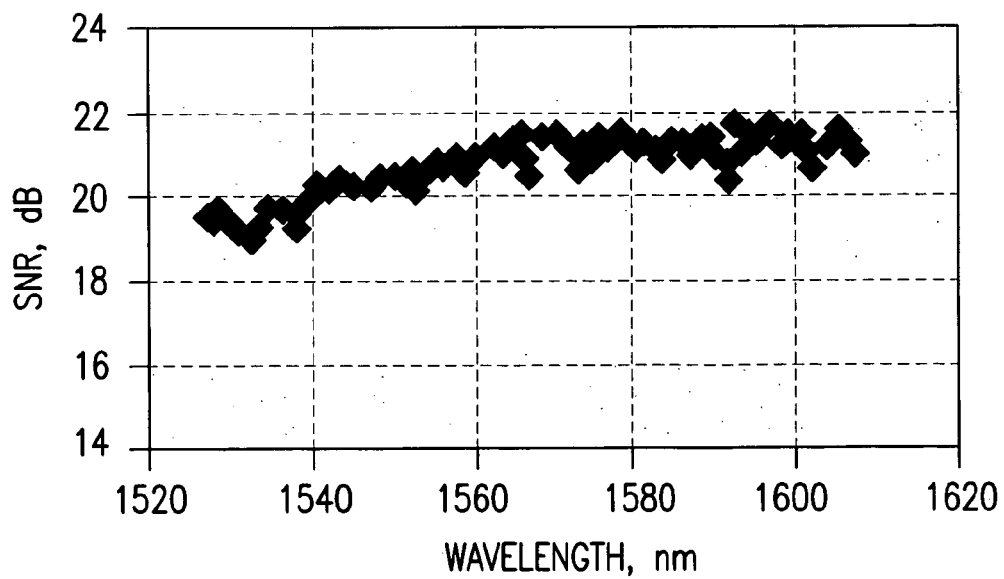
FIG. 6 is a graph illustrating the signal-to-noise ratio (SNR) of one example of a chain of hybrid Raman-EDFAs.

In one example, a 525 km chain of 13 Raman-EDFAs 10 was built and tested. FIG. 6 shows the signal-to-noise ratio (SNR) measured on this exemplary amplifier chain loaded with a nominal input signal. In this example, the SNR varies across the bandwidth from 19 dB (i.e., at the shortest wavelength) to approximately 21.5 dB (i.e., at the best part of the L-band). This SNR, as measured through the exemplary 525 km amplifier chain, corresponds to an equivalent NF (noise figure) of a single Raman-EDFA 10 ranging from about 2.5 to 4.7 dB, which is equal to or better than what can be achieved with a conventional C-band EDFA. The improvement of the SNR towards longer wavelengths can be attributed to the increased contribution from distributed Raman gain, as shown by the Raman gain shape 16 in FIG. 2. During a transmission experiment using the exemplary amplifier chain described above and a 256 channel C+L band transmitter, error free decoding of all channels was achieved with forward error correction (FEC).

Figure 7:
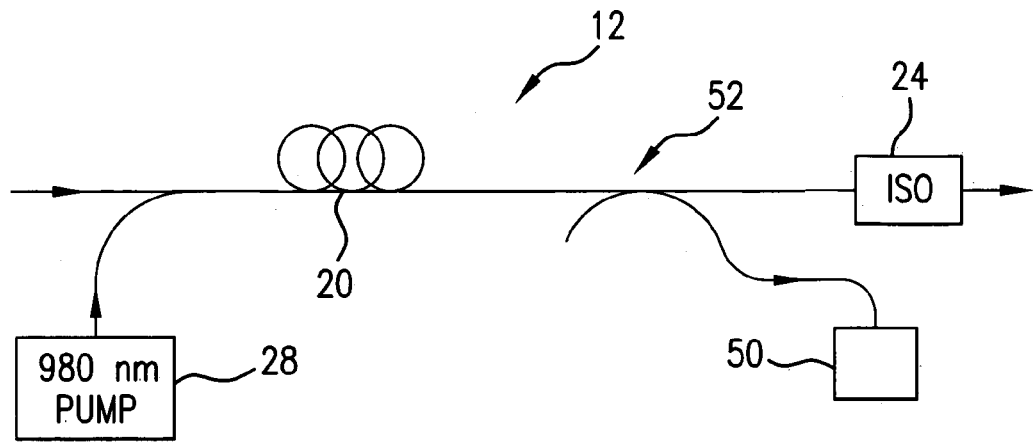
FIG. 7 is a schematic diagram of one embodiment of an EDFA having a high return loss termination, which can be used in the hybrid Raman-EDFA.

Referring to FIG. 7, one preferred embodiment of the highly inverted EDFA 12 includes a high return loss termination 50. As a result of the high inversion, the short length of erbium fiber 20, and the high pump power needed to achieve the desired inversion, a considerable amount of unabsorbed 980 nm pump power emerges out of the erbium fiber 20. For example, where the pump power at 980 nm is 365 mW in the erbium fiber 20, 100 mW of unabsorbed power emerges out of the erbium fiber 20. If this unabsorbed power is allowed to reach the isolator 24, it may exceed the maximum allowable power that can be absorbed by the Faraday crystal. Moreover, in the absence of the transmission of optical signals, which can occur during the service or installation period, this unabsorbed 980 nm pump power can be higher than 300 mW.

To avoid damaging the system, the highly inverted EDFA 12 redirects the unabsorbed pump power to the high return loss termination 50. In the exemplary embodiment, a fused fiber type wavelength division multiplexer (WDM) 52 is installed at the output of the erbium fiber 20 and in front of the isolator 24. The 980 nm WDM 52 redirects the unabsorbed 980 nm radiation into one of its ports, where the high return loss termination 50 is used. The high return loss termination 50 is advantageous because a reflection back at the pump wavelength can reach the 980 nm pump lasers and introduce instability.

Figure 8:
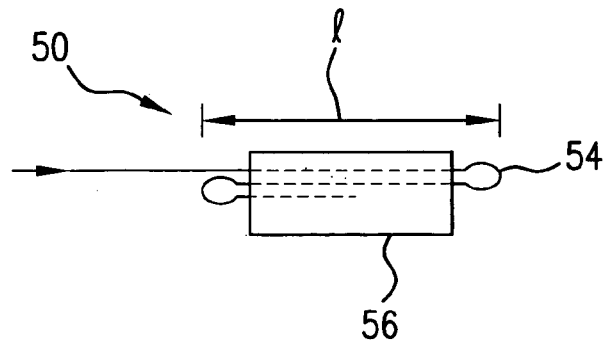
FIG. 8 is a schematic diagram of one embodiment of the high loss termination.

One embodiment of the high return loss termination 50 is shown in greater detail in FIG. 8. This embodiment of the high return loss termination 50 includes a tightly bended fiber 54 embedded in a thermoplastic 56. In one example of the high return loss termination 50, the length l is approximately 1" and the high return loss termination 50 receives about 100–300 mW of pump power. The double loop of the fiber 54 is sufficient to gradually irradiate the optical power from the fundamental to the cladding fiber modes without causing any local heat variations.

Accordingly, the preferred embodiment of the hybrid Raman-EDFA is capable of providing a substantially flat gain over a wider bandwidth in a long-haul submarine system while maximizing Raman efficiency and minimizing damage caused by high pump power.

While the principles of the invention have been described herein, it is to be understood by those skilled in the art that this description is made only by way of example and not as a limitation as to the scope of the invention. Modifications and substitutions by one of ordinary skill in the art are considered to be within the scope of the present invention, which is not to be limited except by the following claims.

The invention claimed is:

1. A transmission system having a dispersion map, said transmission system comprising:
    a transmitter and a receiver;
    a transmission path between said transmitter and said receiver, said transmission path comprising:
        a first group of composite fiber spans including a combination of positive dispersion fibers and negative dispersion fibers and having a residual positive dispersion;
        at least one compensating span following said first group of composite fiber spans, said compensating span including negative dispersion fibers; and
        a second group of composite fiber spans following said compensating span, said composite fiber spans in said second group including a combination of positive dispersion fibers and negative dispersion fibers and having a residual positive dispersion; and
    a plurality of hybrid Raman-EDFAs connected respectively between said fiber spans, each of said Raman-EDFAs including a Raman section and an EDFA section, wherein each said Raman section is coupled to negative dispersion fibers of a respective one of said fiber spans.

2. The transmission system of claim 1 wherein said EDFA section includes a single-stage EDFA.

3. The transmission system of claim 2 wherein said Raman section provides single wavelength unpolarized backward Raman pumping in front of each said single-stage EDFA.

4. The transmission system of claim 3 wherein said single-stage EDFA has an average inversion of at least 0.7 such that gain shapes produced by said Raman section and said EDFA section are complementary and provide a substantially flat composite gain shape.

5. The transmissions system of claim 1 wherein each said EDFA section includes a high return loss termination for receiving unabsorbed pump radiation.

6. The transmission system of claim 1 wherein said composite fiber spans include said positive dispersion fibers and said negative dispersion fibers in a 2:1 ratio.

7. The system of claim 1 wherein said EDFA section includes a single-stage EDFA.

8. The system of claim 7 wherein said single-stage EDFA has an average inversion of at least 0.7.

9. The system of claim 7 wherein said single-stage EDFA has an average inversion of about 0.74.

10. A system for amplifying an optical signal, said system comprising:
   a transmission span including a combination of dispersion matched fibers, said dispersion matched fibers including larger effective area fibers and smaller effective area, wherein said larger effective area fibers have a larger effective area than said smaller effective area fibers;
   at least one Raman pump coupled to said smaller effective area fibers configured for generating a pump wavelength and backward pumping said pump wavelength into said fiber span to produce Raman gain in said optical signal; and
   an erbium doped fiber amplifier (EDFA) coupled after said Raman pump configured for producing EDFA gain in said optical signal complementing said Raman gain, said EDFA including a length of erbium doped fiber and an EDFA pump coupled to said erbium doped fiber, wherein said EDFA has an average inversion of at least 0.7.

11. The system of claim 10 wherein said EDFA has an average inversion of about 0.74.

12. The system of claim 10 wherein said Raman gain is predominantly in the L-band, and wherein said EDFA gain is predominantly in the C-band.

13. The system of claim 10 wherein said at least one Raman pump includes two polarization multiplexed lasers.

14. The system of claim 10 wherein said at least one Raman pump has a wavelength of about 1497 nm.

15. The system of claim 10 wherein said EDFA pump has a wavelength of about 980 nm.

16. The system of claim 15 wherein said EDFA includes an isolator following said erbium doped fiber.

17. The system of claim 16 wherein said EDFA includes a gain flattening filter following said isolator.

18. The system of claim 16 further comprising a high return loss termination coupled after said erbium fiber such that unabsorbed radiation from said EDFA pump is directed to said termination.

19. The system of claim 18 further comprising a wavelength division multiplexer (WDM) at the output of said erbium doped fiber for directing said unabsorbed radiation from said EDFA pump to said high return loss termination.

20. The system of claim 18 wherein said high return loss termination includes a tightly bended fiber.

21. The system of claim 18 wherein said high return loss termination includes a double looped fiber and a thermoplastic surrounding at least a portion of said double looped fiber.

22. The system of claim 10 wherein said fibers with said smaller effective area have a negative dispersion.

23. A transmission system having a dispersion map, said transmission system comprising:
   a transmitter and a receiver;
   a transmission path between said transmitter and said receiver, said transmission path comprising:
      a first group of composite fiber spans including a combination of positive dispersion fibers and negative dispersion fibers and having a residual positive dispersion;
      at least one compensating span following said first group of composite fiber spans, said compensating span including negative dispersion fibers; and
      a second group of composite fiber spans following said compensating span, said composite fiber spans in said second group including a combination of positive dispersion fibers and negative dispersion fibers and having a residual positive dispersion; and
   a plurality of optical amplifiers connected respectively between said fiber spans, wherein each said optical amplifiers is coupled to negative dispersion fibers of a respective one of said fiber spans.

24. A system for amplifying an optical signal, said system comprising:
   a transmission span including a combination of dispersion matched fibers, said dispersion matched fibers including larger effective area fibers and smaller effective area fibers, wherein said larger effective area fibers have a larger effective area than said smaller effective area fibers;
   at least one Raman pump coupled to said smaller effective area fibers configured for generating a pump wavelength and backward pumping said pump wavelength into said fiber span to produce Raman gain in said optical signal; and
   an erbium doped fiber amplifier (EDFA) coupled after said Raman pump for producing EDFA gain in said optical signal complementing said Raman gain, said EDFA including a length of erbium doped fiber and an EDFA pump coupled to said erbium doped fiber, wherein said EDFA comprises a high return loss termination coupled after said erbium fiber such that unabsorbed radiation from said EDFA pump is directed to said termination.

25. The system of claim 24 wherein said high return loss termination includes a double looped fiber and a thermoplastic surrounding at least a portion of said double looped fiber.

* * * * *